United States Patent
Sanders

(10) Patent No.: US 7,889,769 B2
(45) Date of Patent: Feb. 15, 2011

(54) MULTI-SPECTRAL LASER SOURCE EMPLOYING PERIODICALLY POLED CRYSTAL MIXER

(75) Inventor: Scott Thomas Sanders, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 43 days.

(21) Appl. No.: 12/492,768

(22) Filed: Jun. 26, 2009

(65) Prior Publication Data

US 2010/0329291 A1    Dec. 30, 2010

(51) Int. Cl.
*H01S 3/10* (2006.01)
(52) U.S. Cl. ............................ 372/21; 372/20
(58) Field of Classification Search .............. 359/326, 359/237; 372/6, 21, 10
See application file for complete search history.

(56) References Cited

U.S. PATENT DOCUMENTS 5,640,405 A * 6/1997 Wallace et al. ............... 372/21
6,016,214 A * 1/2000 Meyer et al. ................ 359/237
6,101,023 A * 8/2000 Meyer et al. ................ 359/330
7,433,373 B2 * 10/2008 Huang et al. .................. 372/10

OTHER PUBLICATIONS

S. Waltman, et al., Measurement of 13CH4₁₃ 12CH4 ratios in air using diode-pumped 3.3 μm difference-frequency generation in PPLN, 1997, pp. 37-38, *Digest of the IEEE LEOS Summer Topical Meetings*, IEEE Press, New York, New York, USA.

M. Erdélyi, et al., 13CO₂/12CH2 Isotopic Radio Measurements Using a Difference Frequency-Based Sensor Operating at 5.35 μm, Applied Physics B 75, 2002, pp. 289-295, Springer, New York, NY, USA.

D. Richter, et al., Development of An Automated Diode-Based Multicomponent Gas Sensor, Applied Optics, vol. 39, No. 24, Aug. 20, 2000, Optical Society of America, Washington, DC.

Admitted prior art, Isowave Spec Sheet, Periodically Poled Lithium Niobate, Oct. 2002, Isowave, Dover, NJ, USA.

* cited by examiner

*Primary Examiner*—Minsun Harvey
*Assistant Examiner*—Tuan N. Nguyen
(74) *Attorney, Agent, or Firm*—Boyle Fredrickson, S.C.

(57) ABSTRACT

A multi-spectral laser system produces first and second output frequencies by nonlinear mixing of a first, second, and third laser light frequency in a single periodically polled crystal, where the first and second output frequencies are separated by a range greater than the degeneracy of the crystal.

20 Claims, 2 Drawing Sheets

MULTI-SPECTRAL LASER SOURCE EMPLOYING PERIODICALLY POLED CRYSTAL MIXER

STATEMENT REGARDING FEDERALLY SPONSORED RESEARCH OR DEVELOPMENT

This invention was made with United States government support awarded by the following agencies:
NSF 0238633
The United States government has certain rights in this invention.

CROSS REFERENCE TO RELATED APPLICATIONS

- -

BACKGROUND OF THE INVENTION

The present invention relates to multi-frequency laser sources useful for spectroscopy or the like and in particular to a simplified multi-frequency laser source using a nonlinear crystal mixer.

Light sources having frequencies related to absorption lines of chemical species are important elements in instruments such as infrared spectrometers used for chemical analysis. For measurements that require determination of ratios of particular isotopes or the like, a single light source that provides multiple, precisely located frequencies would be useful.

Lasers are known to provide intense narrowband light signals of precise frequency. Unfortunately, conventional lasers cannot be used directly in many important spectrographic applications because they produce light frequencies in the 1 to 1.5 μm range (near infrared) and many spectrographic applications require light in the middle infrared range of approximately 2 to 8 μm.

It is known to convert short wavelength laser light into longer wavelength light using mixers such as periodically poled crystals. One example of such crystals, periodically poled lithium niobate (PPLN), can be used to generate harmonically related frequencies as well as sum and difference frequencies from a mixed laser light from two different lasers simultaneously applied along the axis of the crystal. Periodic polling refers to adjustment of the ferroelectric domains of the crystal on the periodic basis along the crystal axes. Such crystals with different periodicities can be obtained commercially, for example, from Isowave of Dover, N.J., USA.

In order to convert high-frequency laser light into lower frequency light useful for common spectrographic applications, the two lasers (termed the pumping and signal lasers) must be precisely controlled in frequency so that their frequency difference, as will be used for down conversion, equals the desired output light frequency. The frequency of the pumping and signal lasers must also be controlled to be compatible with an operating point of the periodically poled crystal determined by its polling periodicity. The operating point may be adjusted slightly by controlling temperature of the crystal.

When two precisely tuned, mid-infrared or far-infrared light outputs are desired in a spectrographic application, the use of a PPLN crystal for down conversion normally requires two crystals and four lasers, a first pair of lasers (pumping and signal lasers) illuminating a first crystal to produce the first far-infrared light output, and a second pair of lasers (pumping and signal lasers) illuminating a second crystal to produce the second far-infrared light output. Each of the pumping and signal lasers must be designed to produce the desired frequencies. Custom lasers for particular frequencies can be quite expensive.

Recently it has been determined that the operating point of a single PPLN crystal is sufficiently accommodating to allow slight modulation of one of the lasers while still remaining within the operating point of the crystal. See generally: Measurement Of $^{13}CH_4/^{12}CH_4$ Ratios In Air Using Diode-Pumped 3.3 μm Difference-Frequency Generation In PPLN, S. Waltman et al, published in *Vertical-Cavity Lasers, Technologies for a Global Information Infrastructure, WDM Components Technology, Advanced Semiconductor Lasers and Applications, Gallium Nitride Materials, Processing, and Devi*, Aug. 11, 1997, pp 37-38, ISBN: 0-7803-3891-X, INSPEC Accession Number: 5752681.

The frequency bandwidth provided by this modulation has been determined to be sufficient to illuminate the Q(1) line of $^{12}CH_4$ and the R(0) line of $^{13}CH_4$ and thus to permit a direct ratio measurement of these isotopes with only two lasers by absorption at these frequencies.

The Q(1) and R(0) lines relate to different energy states of excitation of the methane molecule. Normally absorption measurements to determine the ratio of gases compare the same lines (e.g. Q(1) of both species). By using different lines Q(1) and R(0), the lines of the different species $^{12}CH_4$ and $^{13}CH_4$ fall within the modulation width of this technique.

This modulation technique substantially simplifies the construction of a spectrographic instrument for measuring isotope ratios by allowing one crystal and two lasers to perform the task of two crystals and four lasers. One drawback to this technique, however, is that the limited modulation range requires measurement of two different absorption lines Q(1) and R(0) to characterize the concentrations of different isotopes and the extraction of concentrations from two different absorption lines requires accurate knowledge of the temperature of the sample to within as little as 100 micro Kelvin. Often temperature measurements of a sample at this accuracy are difficult to obtain.

SUMMARY OF THE INVENTION

The present inventor has recognized that a single periodically poled crystal may simultaneously support mixing of three laser beams, two of which are at frequencies separated by an amount substantially greater than the modulation range of the crystal. This allows the corresponding absorption lines of two species to be measured with less than two crystals and four lasers while also eliminating the need to precisely characterize the sample temperature. The ability to eliminate one laser and one crystal from the mixing process is based on a "back bending" of the modulation curve of the PPLN crystal believed to be present in many periodically polled crystals.

Specifically then, the present invention provides a multi-spectral laser light source providing first, second, and third laser beams producing laser light at first, second and third frequencies. The laser beams illuminate a periodically poled nonlinear crystal to provide a multi-spectral output consisting of a first output frequency being a sum or difference in frequency between the first and second frequencies and a second output frequency being sum or difference in frequency between the second and third frequencies. The periodically poled nonlinear crystal is such as to provide substantially nonlinear mixing of the laser light at the first and second frequencies and at the second and third frequencies, but not at the second frequency and a range of frequencies between the first and third frequencies.

It is thus an object of the invention to provide a multi-spectral light source employing less than two periodically polled nonlinear crystals and less than four lasers.

The multi-spectral laser light source may further include a filter following the periodically poled nonlinear crystal blocking the first, second and third frequencies respectively and blocking some of the first and second frequencies and the some of the second and third frequencies wherein the first output frequency is a difference in frequency between the first and second frequencies and the second output frequency is a difference in frequency between the second and third frequencies.

It is thus an object of the invention to provide for a down conversion of laser light to a spectrographically interesting far infrared region.

The first and second output frequencies are at corresponding absorption lines of two isotopes.

It is thus an object of the invention to provide a multi-spectral light source suitable for spectrographic measurements where the temperature of the sample cannot be precisely characterized.

The first and second frequencies may be corresponding lines of C12 and C13.

It is thus an object of the invention to provide a light source suitable for ratio measurements of carbon isotopes that may be implicated in detection of bacterial or viral disease.

The first, second, and third frequencies may be in the near-infrared region within the wavelength range of substantially 800 to 2000 nm. The first and second frequencies may be substantially at wavelengths of 800 and 810 nm.

It is thus an object of the invention to work with readily available lasers.

The first output frequency and the second output frequency may be substantially at wavelengths of 4000 nm and 4250 nm.

It is thus an object of the invention to provide output frequencies at important absorption lines of carbon species.

The multi-spectral laser light source may further include a test cell for holding an analyte and a light sensor for measuring the properties of the analyte at the first output frequency and second output frequency.

It is thus an object of the invention to provide a compact and inexpensive spectrometer for making ratio type measurements.

These particular objects and advantages may apply to only some embodiments falling within the claims and thus do not define the scope of the invention.

DETAILED DESCRIPTION OF THE PREFERRED EMBODIMENT

Figure 1:
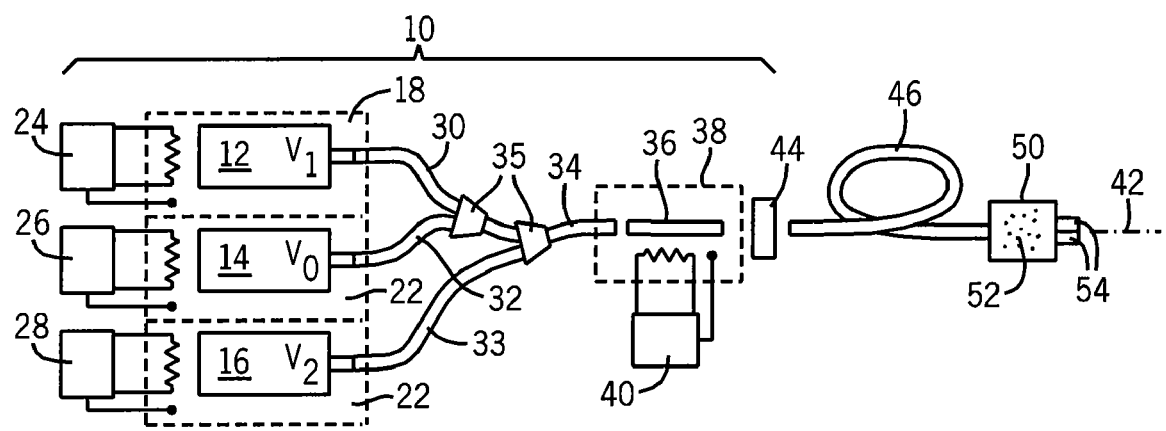
FIG. 1 is a simplified schematic diagram of an instrument constructed according to the present invention employing three lasers and a single, common, periodically polled nonlinear crystal.

Referring now to FIG. 1, a multi-spectral laser source 10 constructed according to the present invention may provide three fiber-coupled lasers 12, 14 and 16, each held respectively in a thermally controlled housing 18, 20 and 22 having independent temperature controllers 24, 26 and 28. The temperature controllers 24, 26, and 28 may provide for feedback control of a heater using a temperature sensor as is generally understood in the art. Temperature control may be used to ensure precise phase and frequency matching of the light from the lasers 12, 14, and 16 according to methods known in the art.

Fibers 30, 32, and 33 conducting light output from each laser 12, 14, and 16 may join with one or more combiners 35 to combine the light from each of the lasers 12, 14, and 16 to a single fiber 34. Fiber 34 may conduct the light to a periodically poled crystal 36 along an axis 42 of the crystal 36. The crystal 36 is also contained in thermally controlled housing 38, generally, thermally independent from housings 18, 20, and 22 and having a corresponding controller 40 for controlling the temperature of that housing 38. Temperature control of the periodically polled crystal 36 allows tuning of the frequency characteristics of the crystal 36 according to methods known in the art.

The light from the fiber 34, after passing through the crystal 36, exits the crystal 36 through a filter 44. The filter 44 may be, for example, a germanium filter blocking the near infrared light frequencies output by the lasers 12, 14 and 16 and allowing passage only of the far-infrared converted frequencies. These new light frequencies, exiting the filter 44 may then be received by fiber 46 or other optical device. As depicted in FIG. 1, the multi-spectral laser source 10 may be used to provide illumination to a test cell 50 containing an analyte gas 52. Frequency sensing photodetectors 54 may provide signals indicating absorption of the gas at the frequencies emitted by the crystal 36. The frequency sensing photodetectors may be one or more photodetectors associated with particular filters each passing a single different frequency output from the crystal 36, or a scanned diffraction grating or the like, or other frequency discriminating technique.

Figure 2:
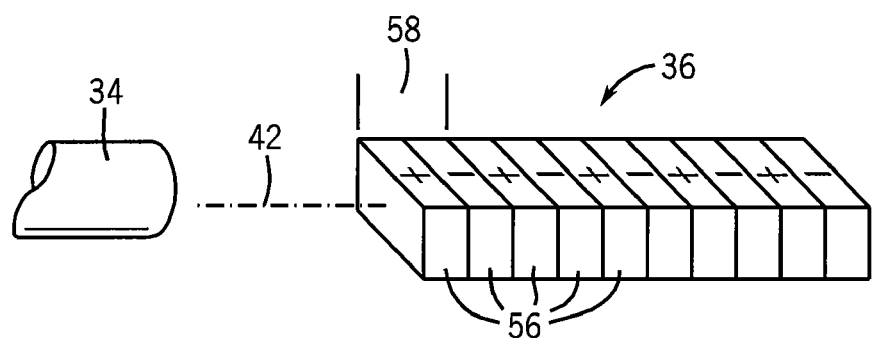
FIG. 2 is an orthographic view of the crystal of FIG. 1 showing the polling period and the axis of the crystal.

Referring to FIG. 2, the crystal 36 may be, for example, periodically poled lithium niobate or periodically poled stoichiometric lithium tantalate, receiving light along the axis 42 so that the light passes through periodically poled domains 56 each having a respective 180° inversion of the polling. The polling periods 58, defined by a length along axis 42 of two adjacent domains, determine the operating frequencies of the crystal with respect to nonlinear mixing. As will be understood to those of ordinary skill in the art, the nonlinear mixing process may produce harmonics of the frequencies of the light input to the crystal 36 as well as sum and difference frequencies. Thus, for example, two frequencies $\nu_1$ and $\nu_2$ at the proper operating point of the crystal 36 may produce frequencies at: $3\nu_0$, $2\nu_0$, $2\nu_1$, $\nu_0+\nu_1$, and $\nu_0-\nu_1$.

Figure 3:
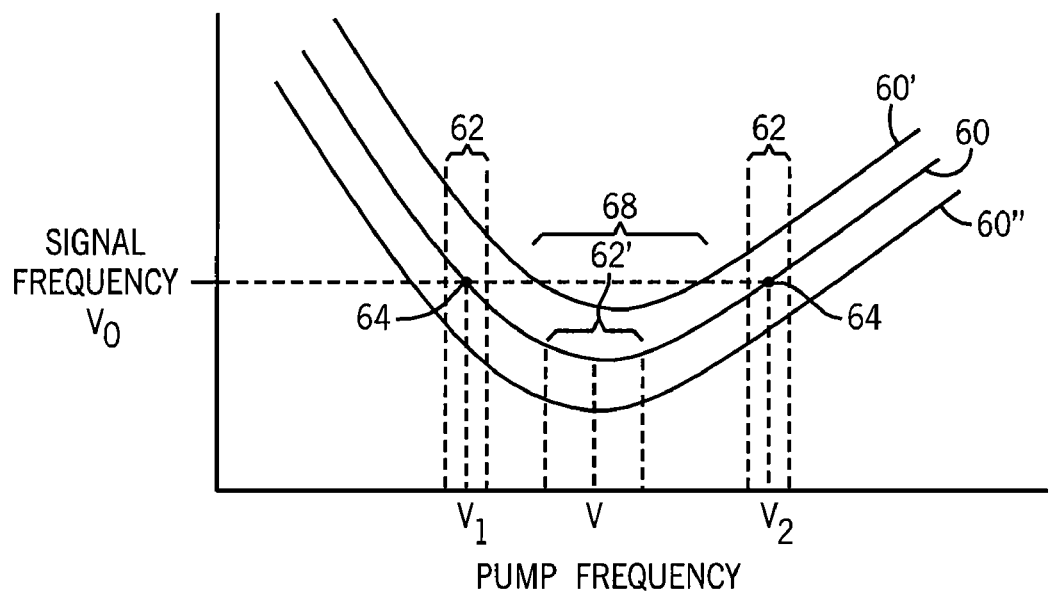
FIG. 3 is a refraction index plot representative of periodically polled nonlinear crystals showing the frequency-non-monotonic mixing characteristic that permits three lasers to produce widely separated sum or difference output frequencies.

Referring now to FIG. 3, the permissible combination of pumping and signal frequencies that may be mixed by crystal 36 is defined by a refraction index curve 60 for the particular crystal 36. Generally mixing will only occur when the input pumping and signal frequencies intersect substantially on the curves 60. As noted above, however, the crystals 36 permit some frequency degeneracy allowing minor frequency excursions 62 about operating points 64 from the pumping or signal laser such as permit limited modulation of their frequencies while still permitting nonlinear mixing. Further, the location of the curve 60 may be moved as shown by curves 60' and 60" by changing the polling period or temperature (within a small range) of the crystal 36.

Nevertheless, generally, the present invention uses pumped frequencies $\nu_1$ and $\nu_2$ that are separated by much more than the frequency excursions 62 at those frequencies as will be termed the crystal degeneracy. More specifically, for a given signal frequency $v_0$ the two pumped frequencies $v_1$ and $v_2$ are separated by a region 68 at which no substantial mixing can occur for signals $v_0$ and $v_1$ or $v_0$ and $v_2$. Importantly, the frequency separation is such as to allow the difference frequencies $v_0-v_1$ and $v_0-v_1$ to excite different isotopes of common carbon species at corresponding absorption lines greatly reducing the need to know the sample temperature as described above.

Generally, the frequencies $v_1$ and $v_2$ chosen have relatively narrow frequency excursions 62 compared to the maximum frequency excursions 62' possible were modulation desired (typically at an inflection point in the curve 60 between operating points 64 for frequencies $v_1$, $v_1$).

Figure 4:
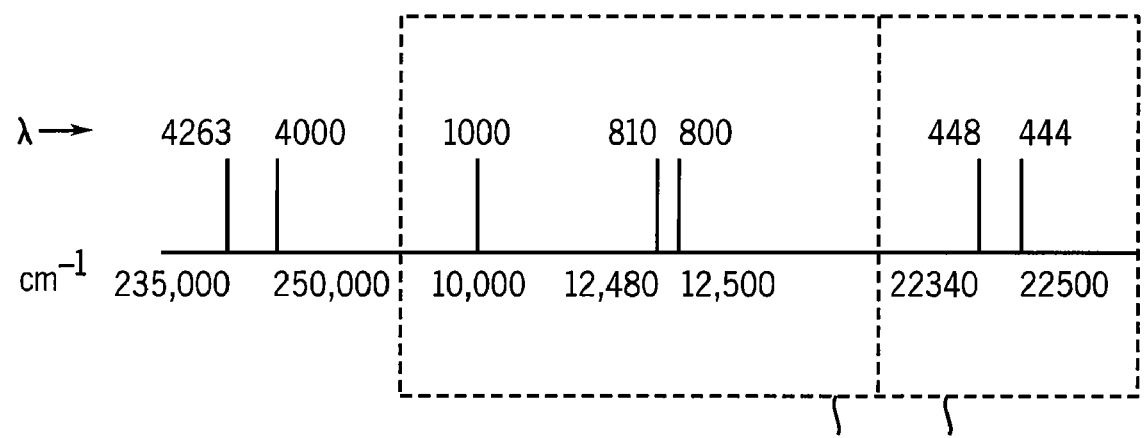
FIG. 4 is a spectral plot showing filter placement used in the present invention.

Referring now to FIG. 4, in one embodiment of the invention, laser 14 (the signal laser) may have a wavelength of 1000 nm while the two pumping lasers 12 and 16, may have wavelengths of 800 nm and 810 nm respectively. The crystal 36 will produce sum and difference frequencies where the difference frequencies are at approximately 4000 nm and 4263 nm wavelengths (in the far infrared) and the sum frequencies are at approximately 448 and 444 nm wavelengths respectively. The germanium filter 44 may provide a low pass characteristic eliminating the laser frequencies 70 originally emitted from the lasers 12, 14, and 16 and the sum frequencies 72 leaving as output only the difference frequencies aligned with the desired carbon isotopes.

While the present invention contemplates the use of at least three lasers, the invention may have possible utility when used with fewer than three lasers where at least one laser provides a multispectral output, It will be understood, generally, that the designation of signal laser and pumping laser is arbitrary and does not denote a particular frequency of the laser.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A multi-spectral laser light source comprising:
a first, second, and third laser beam providing laser light at first, second and third frequencies, respectively;
a periodically poled nonlinear crystal positioned to receive the first, second, and third laser beams to provide a multi-spectral output including a first output frequency being a sum or difference in frequency between the first and second frequencies and a second output frequency being sum or difference in frequency between the second and third frequencies;
wherein the periodically poled nonlinear crystal provides substantial nonlinear mixing of the laser light at the first and second frequencies and at the second and third frequencies, but not at the second frequency and a range of frequencies between the first and third frequencies.

2. The multi-spectral laser light source of claim 1 further including a filter following the periodically poled nonlinear crystal blocking the first, second and third frequencies respectively,
wherein the first output frequency is a difference in frequency between the first and second frequencies and the second output frequency is a difference in frequency between the second and third frequencies.

3. The multi-spectral laser light source of claim 1 wherein the first output frequency and second output frequency are at corresponding absorption lines of two isotopes.

4. The multi-spectral laser light source of claim 3 wherein the first and second frequencies are corresponding lines of $^{12}CO_2$ and $^{13}CO_2$.

5. The multi-spectral laser light source of claim 1 wherein the first, second, and third frequencies are in the near infrared region within a wavelength range of substantially 800 to 2000 nm.

6. The multi-spectral laser light source of claim 1 wherein the first and second frequencies are substantially at wavelengths of 800 and 810 nm.

7. The multi-spectral laser light source of claim 1 wherein the first output frequency and the second output frequency are substantially at wavelengths of 4000 nm and 4250 nm.

8. The multi-spectral laser light source of claim 1 further including a filter following the periodically poled nonlinear crystal blocking the first, second and third frequencies respectively.

9. The multi-spectral laser light source of claim 1 wherein the periodically poled nonlinear crystal is selected from the group consisting of periodically poled lithium niobate, and periodically poled stoichiometric lithium tantalate.

10. The multi-spectral laser light source of claim 1 further including a test cell for holding an analyte and a light sensor for measuring properties of the analyte at the first output frequency and second output frequency.

11. A method of producing multi-spectral laser light comprising:
(a) producing laser light at first, second and third frequencies, respectively;
(b) mixing the first, second, and third frequencies in a periodically poled nonlinear crystal positioned to receive laser light simultaneously from the first, second and third lasers and to provide a multi-spectral output including a first output frequency being a sum or difference in frequency between the first and second frequencies and a second output frequency being sum or difference in frequency between the second and third frequencies;
wherein the periodically poled nonlinear crystal provides substantial nonlinear mixing of the laser light at the first and second frequencies and at the second and third frequencies, but not at the second frequency and a range of frequencies between the first and third frequencies.

12. The method of claim 11 wherein the first output frequency and second output frequency are at corresponding absorption lines of two isotopes.

13. The method of claim 12 wherein the first and second frequencies are lines of carbon isotopes related to corresponding excitation energy levels.

14. The method of claim 12 wherein the first and second frequencies are corresponding lines of $^{12}CO_2$ and $^{13}CO_2$.

15. The method of claim 11 wherein the first, second, and third frequencies are in the near infrared region within a wavelength range of substantially 800 to 2000 nm.

16. The method of claim 11 wherein the first and second frequencies are substantially at wavelengths of 800 and 810 nm.

17. The method of claim 11 wherein the first output frequency and the second output frequency are substantially at wavelengths of 4000 nm and 4250 nm.

18. The method of claim 11 further including filtering the output of the poled nonlinear crystal to block the first, second and third frequencies respectively.

19. The method of claim 11 further including the step of adjusting a temperature of at least one of the first, second and third lasers and the nonlinear crystal to provide for a phase matching of the light from the first, second and third lasers.

20. The method of claim 11 further including the step of illuminating an analyte to measure properties of the analyte at the first output frequency and second output frequency.

* * * * *